US009183645B2

(12) United States Patent
Puckett

(10) Patent No.: US 9,183,645 B2
(45) Date of Patent: Nov. 10, 2015

(54) SYSTEM AND METHOD FOR FAST MANIPULATION OF GRAPHICAL OBJECTS

(71) Applicant: CANON KABUSHIKI KAISHA, Tokyo (JP)

(72) Inventor: Giles Anderson Puckett, Samford (AU)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/871,252

(22) Filed: Apr. 26, 2013

(65) Prior Publication Data

US 2013/0286044 A1 Oct. 31, 2013

(30) Foreign Application Priority Data

Apr. 30, 2012 (AU) ................................ 2012202492

(51) Int. Cl.
| | |
|---|---|
| *G06T 11/20* | (2006.01) |
| *G06T 11/00* | (2006.01) |
| *G06T 11/40* | (2006.01) |
| *H04N 1/41* | (2006.01) |
| *G06F 3/12* | (2006.01) |
| *G06K 15/02* | (2006.01) |
| *G09G 5/20* | (2006.01) |

(52) U.S. Cl.
CPC ................ *G06T 11/00* (2013.01); *G06T 11/40* (2013.01); *G06F 3/122* (2013.01); *G06K 15/181* (2013.01); *G06T 11/203* (2013.01); *G06T 11/206* (2013.01); *G09G 5/20* (2013.01); *H04N 1/41* (2013.01)

(58) Field of Classification Search
CPC ...... G06K 15/181; G06F 3/122; G06T 11/40; G06T 11/203; G06T 11/206; H04N 1/41; G09G 5/20
USPC .................. 345/440–443, 501, 629, 581, 528; 358/1.13, 1.15, 1.9, 1.8
See application file for complete search history.

(56) References Cited

U.S. PATENT DOCUMENTS

| | | | | |
|---|---|---|---|---|
| 6,662,270 | B1 * | 12/2003 | Sans et al. ...................... | 711/118 |
| 7,133,158 | B2 | 11/2006 | Ghose et al. | |
| 2005/0094191 | A1 * | 5/2005 | Vondran et al. ............... | 358/1.15 |
| 2006/0066621 | A1 * | 3/2006 | Herceg et al. ................. | 345/501 |
| 2006/0192983 | A1 * | 8/2006 | Groarke et al. ................ | 358/1.9 |
| 2007/0206012 | A1 * | 9/2007 | Combes et al. ................ | 345/441 |
| 2008/0273218 | A1 * | 11/2008 | Kitora et al. .................. | 358/1.13 |
| 2009/0185214 | A1 * | 7/2009 | Bellert et al. ................. | 358/1.15 |
| 2012/0105911 | A1 * | 5/2012 | Belbin .......................... | 358/1.15 |
| 2013/0169980 | A1 * | 7/2013 | Johnson et al. ................ | 358/1.8 |

* cited by examiner

*Primary Examiner* — Jin-Cheng Wang
(74) *Attorney, Agent, or Firm* — Canon U.S.A., Inc., IP Division

(57) ABSTRACT

A method of repeatedly rendering to a page a group of objects represented by edges, by identifying a first occurrence of the group in a display list by an identifier, associating the identifier with a display list representation of the group, using the identifier to determine locations on the page where the group is to be repeated, determining if the display list representation of the group is to be used to repeat the group at the locations, repeating in the display list the occurrence of the display list representation of the group, the repeated display list representations comprising (a) transformations of the starting locations of the edges making up the group, shared by each of the repeated edges, and (b) fill and level information accessed by reference associated with each of the edges.

15 Claims, 16 Drawing Sheets

SYSTEM AND METHOD FOR FAST MANIPULATION OF GRAPHICAL OBJECTS

REFERENCE TO RELATED PATENT APPLICATION(S)

This application claims the benefit under 35 U.S.C. §119 of the filing date of Australian Patent Application No 2012202492, filed 30 Apr. 2012, hereby incorporated by reference in its entirety as if fully set forth herein.

TECHNICAL FIELD

The current invention relates to computer graphics, and in particular to a high performance method for rendering repeated instances of graphical objects using as little computer memory as possible. The current invention also relates to a computer program product including a computer readable medium having recorded thereon a computer program for high performance rendering of repeated instances of graphical objects using as little computer memory as possible.

BACKGROUND

Computer software systems such as word processors, page composition programs and the like are generally configured to render, into device pixels, collections of graphical objects such as bitmap images, photographic images, text, and filled shapes. In these systems it is common to receive instructions from the page description file (typically referred to by the acronym "PDL"), which may be PDF, PostScript, GDI or the like, to render a sequence or group of objects over and over again. The term PDL may refer in this specification either to the page description file, or to the Page Description Language used to produce the page description file.

The instruction to render an object repeatedly may occur as an explicit instruction to create a region tiled with these objects at a regular spacing, or the instruction may require that a group be printed once and then again at a different unrelated location, possibly after being processed by a spatial transform. Either of these cases involves repeated use of CPU time and memory, which systems in the art have attempted to reduce in various ways.

For example, a tiled region may be painted by rendering its constituent objects to pixels at device resolution and then allowing the final page render to tile the image by wrapping it modulo the image size. Rendering the objects to pixels at device resolution presents difficulties due to large memory usage when the repeated tile is large, and also cannot always produce correct results when the tiled group uses some compositing operations with its background.

Other systems have attempted to represent the repeated image more compactly by using an intermediate format such as run-length encoding or filled trapezoids, but these schemes have been limited to upright tiles and simple integer pixel translations of the tile, which do not satisfy the requirement of all PDL's.

Alternatively, a system may re-use or repeat the objects simply by replaying them from the PDL, but this method can suffer from performance degradation when the objects making up the group contain complex operations such as color conversions and the like, which are then executed many times for the same input data. Also with some PDL's it is not feasible to replay objects on request.

SUMMARY

It is an object of the present invention to substantially overcome, or at least ameliorate, one or more disadvantages of existing arrangements. Disclosed are arrangements, referred to as Partial Display List Replication (PDLR) arrangements, which seek to address the above problems by transforming and replicating some parts of the display list associated with the group of objects to be repeated, and sharing those parts of the display list that need not be transformed.

According to a first aspect of the present invention, there is provided a method of rendering repeatedly at least one object in a display list, the at least one object represented by edges having at least their starting locations in absolute coordinate form, the method comprising the steps of:

identifying a first occurrence of the at least one graphical object in the display list;

to repeat the first occurrence of the at least one object at a plurality of locations, generating a display list representation by sharing, in the display list, at least one of:
 (a) transformations of the starting locations of the edges making up the at least one object;
 (b) fill data; and
 (c) segments of the edges of the at least one object; and rendering the at least one object to the corresponding plurality of locations using the shared display list representation in the display list.

According to another aspect of the present invention, there is provided a method of rendering repeatedly at least one object in a display list, the method comprising the steps of:

determining a tile size of a first occurrence of the at least one object;

if the tile size is smaller than a threshold, rendering a display list representation to a pixel representation for the first occurrence of the at least one object and copying repeatedly the pixel representation to a plurality of locations on a page; and if the tile size is not smaller than a threshold, copying repeatedly the display list representation to a plurality of locations on the page and rendering the repeated display list representation.

According to another aspect of the present invention, there is provided an apparatus for implementing any one of the aforementioned methods.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
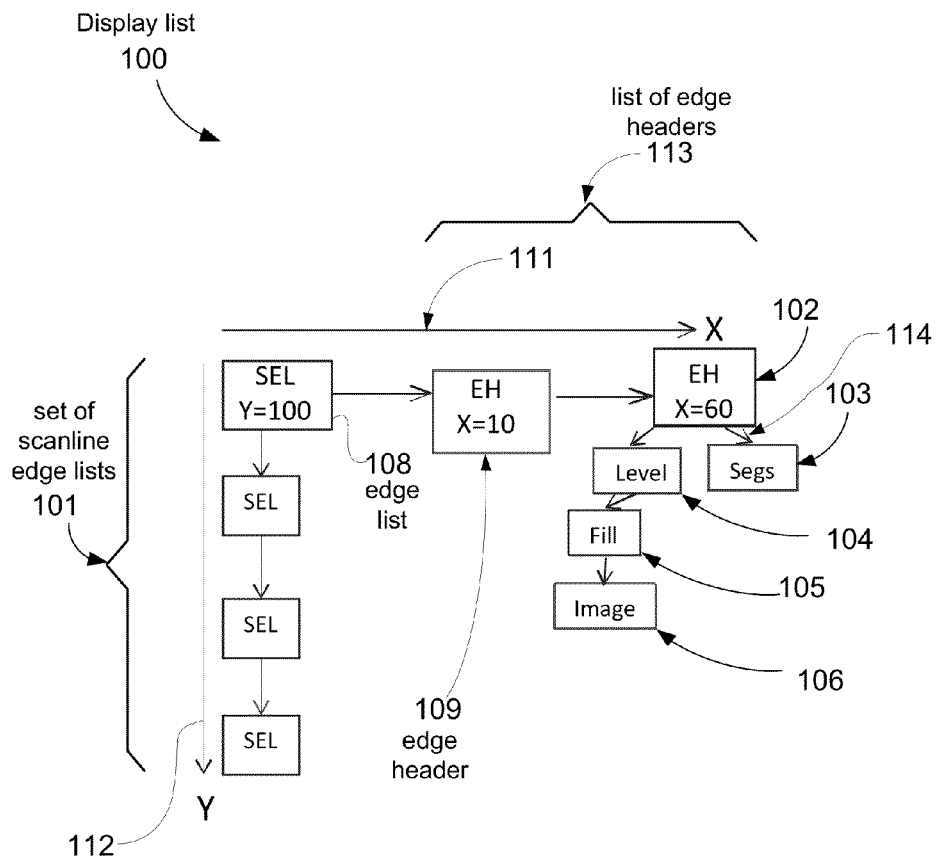
FIG. 1 depicts a display list structure as used by a pixel-sequential renderer.

It is the intention of the present invention to overcome these disadvantages, by providing a mechanism for representing the objects in the group to be repeatedly rendered that allows both rapid copying with transformation, and high-speed rendering.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of devices which may form public knowledge through their use. Such discussions should not be interpreted as a representation by the present inventor(s) or the patent applicant that such documents or devices in any way form part of the common general knowledge in the art.

A method 1200 (see FIG. 12) of rendering a graphical object on a page is described below with reference to FIGS. 1A to 14.

Figure 10:
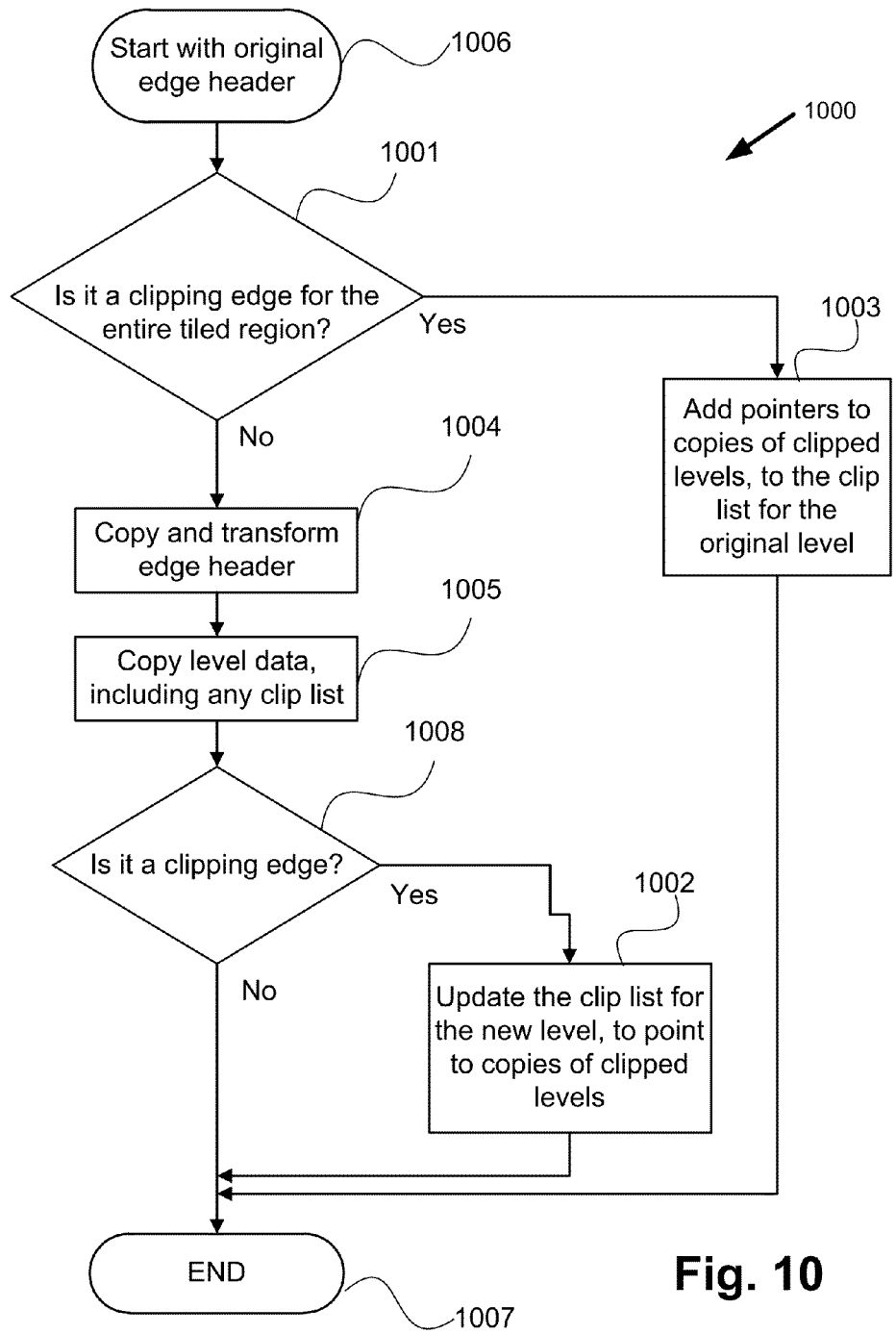
FIG. 10 depicts a flowchart of the steps involved in copying clipping data structures belonging to objects in a group, according to a PDLR arrangement.
Figure 11A:
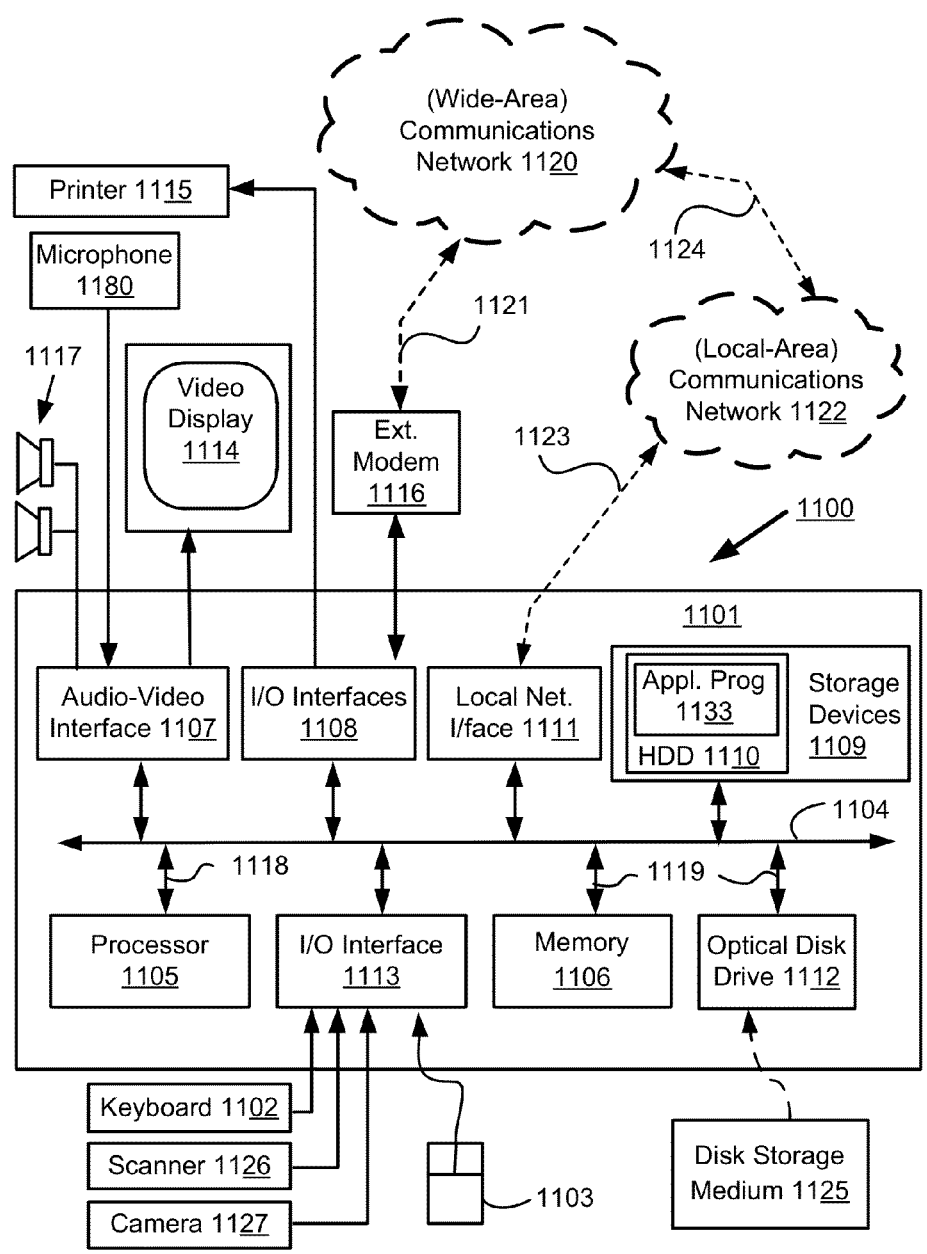
FIGS. 11A and 11B collectively form a schematic block diagram of a data processing architecture useful in the arrangements to be described.
Figure 11B:
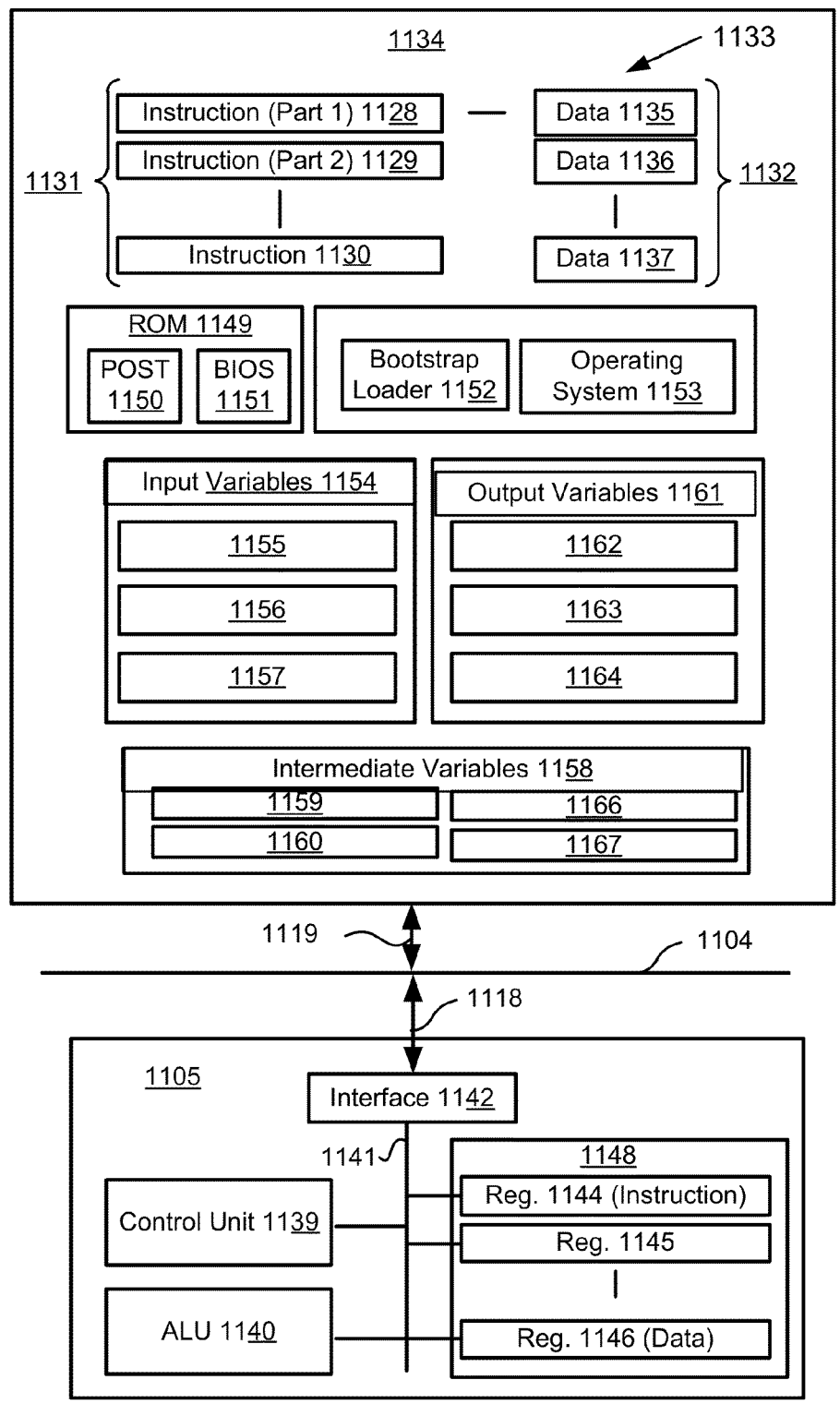

FIGS. 11A and 11B depict a general-purpose computer system 100, upon which the described PDLR methods described below with reference to FIGS. 1A to 14, including the method 300, may be practised.

As seen in FIG. 11A, the computer system 1100 includes: a computer module 1101; input devices such as a keyboard 1102, a mouse pointer device 1103, a scanner 1126, a camera 1127, and a microphone 1180; and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The communications network 1120 may be a wide-area network (WAN), such as the Internet, a cellular telecommunications network, or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the communications network 1120.

The computer module 1101 typically includes at least one processor unit 1105, and a memory unit 1106. For example, the memory unit 1106 may have semiconductor random access memory (RAM) and semiconductor read only memory (ROM). The computer module 1101 also includes a number of input/output (I/O) interfaces including: an audio-video interface 1107 that couples to the video display 1114, loudspeakers 1117 and microphone 1180; an I/O interface 1113 that couples to the keyboard 1102, mouse 1103, scanner 1126, camera 1127 and optionally a joystick or other human interface device (not illustrated); and an interface 1108 for the external modem 1116 and printer 1115. In some implementations, the modem 1116 may be incorporated within the computer module 1101, for example within the interface 1108. The computer module 1101 also has a local network interface 1111, which permits coupling of the computer system 1100 via a connection 1123 to a local-area communications network 1122, known as a Local Area Network (LAN). As illustrated in FIG. 11A, the local communications network 1122 may also couple to the wide network 1120 via a connection 1124, which would typically include a so-called "firewall" device or device of similar functionality. The local network interface 1111 may comprise an Ethernet circuit card, a Bluetooth® wireless arrangement or an IEEE 802.11 wireless arrangement; however, numerous other types of interfaces may be practiced for the interface 1111.

The I/O interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1100.

The components 1105 to 1113 of the computer module 1101 typically communicate via an interconnected bus 1104 and in a manner that results in a conventional mode of operation of the computer system 1100 known to those in the relevant art. For example, the processor 1105 is coupled to the system bus 1104 using a connection 1118. Likewise, the memory 1106 and optical disk drive 1112 are coupled to the system bus 1104 by connections 1119. Examples of computers on which the described arrangements can be practised include IBM-PC's and compatibles, Sun Sparcstations, Apple Mac™ or a like computer systems.

The described methods, including the method 200, may be implemented using the computer system 1100 wherein the processes of FIGS. 1 to 14, to be described, may be implemented as one or more PDLR software application programs 1133 executable within the computer system 1100. In particular, the steps of the described method 200 are effected by instructions 1131 (see FIG. 11B) in the software application program 1133 that are carried out within the computer system 1100. The software instructions 1131 may be formed as one or more software code modules, each for performing one or more particular tasks. The software application program 1133 may also be divided into two separate parts, in which a first part and the corresponding software code modules performs the described methods and a second part and the corresponding software code modules manage a user interface between the first part and the user.

The software application program 1133 may be stored in a computer readable medium, including the storage devices described below, for example. The software application program 1133 is loaded into the computer system 1100 from the computer readable medium, and is then executed by the computer system 1100. A computer readable medium having such software or computer program recorded on the computer readable medium is a computer program product. The use of the computer program product in the computer system 1100 preferably effects an advantageous apparatus for implementing the described PDLR methods.

The software application program 1133 is typically stored in the HDD 1110 or the memory 1106. The software application program 1133 is loaded into the computer system 1100 from a computer readable medium, and executed by the computer system 1100. Thus, for example, the software application program 1133 may be stored on an optically readable disk storage medium (e.g., CD-ROM) 1125 that is read by the optical disk drive 1112. The software application program 1133 is configured to direct the processor 1105 to effect the PDLR methods.

In some instances, the software application program 1133 may be supplied to the user encoded on one or more CD-ROMs 1125 and read via the corresponding drive 1112, or alternatively may be read by the user from the networks 1120 or 1122. Still further, the software application program 1133 can also be loaded into the computer system 1100 from other computer readable media.

Computer readable storage media refers to any non-transitory tangible storage medium that provides recorded instructions and/or data to the computer system 1100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1101.

Examples of transitory or non-tangible computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the software application program 1133 and the corresponding software code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 1101 in FIG. 11A.

When the computer module 1101 is initially powered up, a power-on self-test (POST) program 1150 executes. The POST program 1150 is typically stored in a ROM 1149 of the semiconductor memory 1106 of FIG. 11A. A hardware device such as the ROM 1149 storing software is sometimes referred to as firmware. The POST program 1150 examines hardware within the computer module 1101 to ensure proper functioning and typically checks the processor 1105, the memory 1134 (109, 1106), and a basic input-output systems software (BIOS) module 1151, also typically stored in the ROM 1149, for correct operation. Once the POST program 1150 has run successfully, the BIOS 1151 activates the hard disk drive 1110 of FIG. 11A. Activation of the hard disk drive 1110 causes a bootstrap loader program 1152 that is resident on the hard disk drive 1110 to execute via the processor 1105. This loads an operating system 1153 into the RAM memory 1106, upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory 1134 (1109, 1106) to ensure that each process or application running on the computer module 1101 has sufficient memory in which to execute without colliding with memory allocated to another process. Furthermore, the different types of memory available in the system 1100 of FIG. 11A must be used properly so that each process can run effectively. Accordingly, the aggregated memory 1134 is not intended to illustrate how particular segments of memory are allocated (unless otherwise stated), but rather to provide a general view of the memory accessible by the computer system 11100 and how such is used.

As shown in FIG. 11B, the processor 1105 includes a number of functional modules including a control unit 1139, an arithmetic logic unit (ALU) 1140, and a local or internal memory 1148, sometimes called a cache memory. The cache memory 1148 typically includes a number of storage registers 1144-1146 in a register section. One or more internal busses 1141 functionally interconnect these functional modules. The processor 1105 typically also has one or more interfaces 1142 for communicating with external devices via the system bus 1104, using a connection 1118. The memory 1134 is coupled to the bus 1104 using a connection 1119.

The PDLR software application program 1133 includes a sequence of instructions 1131 that may include conditional branch and loop instructions. The software application program 1133 may also include data 1132 which is used in execution of the program 1133. The instructions 1131 and the data 1132 are stored in memory locations 1128, 1129, 1130 and 1135, 1136, 1137, respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128 and 1129.

In general, the processor 1105 is given a set of instructions which are executed therein. The processor 1105 waits for a subsequent input, to which the processor 1105 reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into the corresponding reader 1112, all depicted in FIG. 11A. The execution of a set of the instructions may in some cases result in output of data. Execution may also involve storing data or variables to the memory 1134.

The described methods use input variables 1154, which are stored in the memory 1134 in corresponding memory locations 1155, 1156, 1157. The methods produce output variables 1161, which are stored in the memory 1134 in corresponding memory locations 1162, 1163, 1164. Intermediate variables 1158 may be stored in memory locations 1159, 1160, 1166 and 1167.

Referring to the processor 1105 of FIG. 11B, the registers 1144, 1145, 1146, the arithmetic logic unit (ALU) 1140, and the control unit 1139 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128, 1129, 1130;

(b) a decode operation in which the control unit 1139 determines which instruction has been fetched; and (c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 1 to 14 is associated with one or more segments of the software application program 1133 and is performed by the register section 1144, 1145, 1147, the ALU 1140, and the control unit 1139 in the processor 1105 working together to perform the fetch, decode, and execute cycles for every instruction in the instruction set for the noted segments of the software application program 1133.

The PDLR methods described below with reference to FIGS. 1A to 14, including the method 300 in FIG. 3, may alternatively be implemented in dedicated hardware such as one or more gate arrays and/or integrated circuits performing the PDLR functions or sub functions. Such dedicated hardware may also include graphic processors, digital signal processors, or one or more microprocessors and associated memories. If gate arrays are used, the process flow charts in FIGS. 1-14 are converted to Hardware Description Language (HDL) form. This HDL description is converted to a device level netlist which is used by a Place and Route (P&R) tool to produce a file which is downloaded to the gate array to program it with the design specified in the HDL description.

Figure 12:
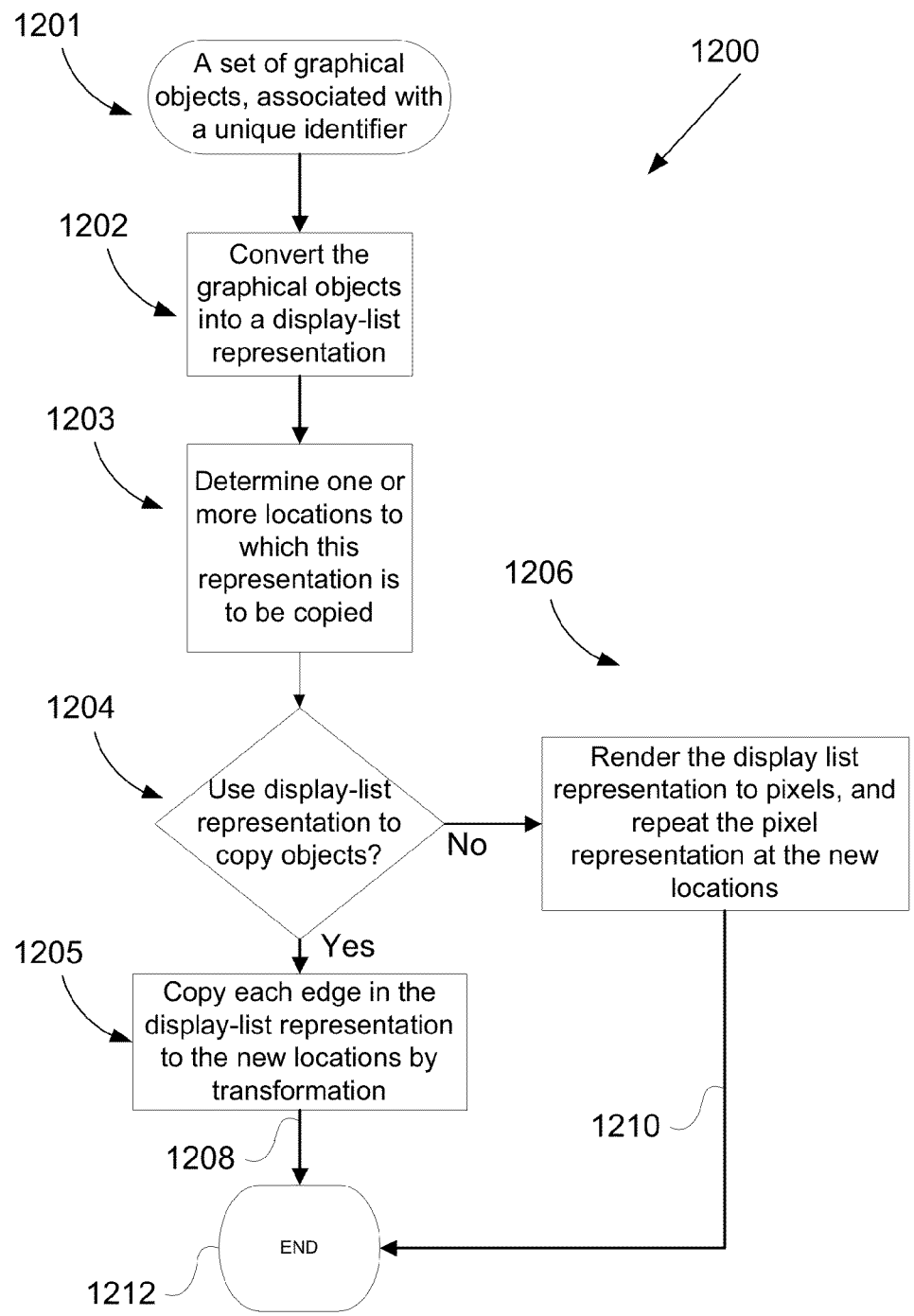
FIG. 12 depicts a flowchart of the steps of rendering a group of repeated objects according to the present disclosure.

FIG. 12 shows the process 1200 for repeatedly rendering a group (ie a plurality) of graphical objects according to the PDLR arrangement. The process 1200 initiates with the processor 1105 receiving from the PDL, in a step 1201, a set of graphical objects, this set of graphical objects being associated with a unique identifier 208 (see FIG. 2) such that the set is identifiable by the processor 1105. Then, in a following step 1202 the processor 1105 converts the graphical objects into a display list representation in one implementation of a PDLR arrangement. In a next determining step 1203, the processor 1105 determines from the PDL one or more locations on the page to which the plurality of graphical objects described by this display list representation is to be rendered (ie copied) based on a tiling requirement of the repeated object. The tiling requirement, such as the shape to be filled, the object(s) making up the tile and the size of the tiles, is specified in the PDL. The processor 1105 then decides, in a step 1204, if the display list representation is to be used for rendering the objects. This step 1204 is described hereinafter in further detail with reference to FIG. 13.

If the decision step 1204 determines that the display list representation is to be used for copying the objects, the process 1200 follows a YES arrow from the step 1204 to a step 1205 in which the processor 1105 copies to the display list, by means of a set of copy and transformation operations such as translation, rotation and skew operations, transformed instances of the first instance of each edge in the display list representation according to the determining step 1203. The process 1200 then follows an arrow 1208 to a step 1212 which is the end of the process, signifying the completion of the copying of objects.

On the other hand, if the decision step 1204 determines that the display list representation compiled in step 1202 is not to be used for copying the objects, the process 1200 follows a NO arrow from the step 1204 to a step 1206 in which the processor renders the display list representation to pixels and repeatedly renders the pixel representation at the new locations on the page as determined in the determining step 1203. The process 1200 then follows an arrow 1210 to the step 1212 which is the end of the process, signifying the completion of the copying of objects.

Pixel Sequential rendering systems commonly use a pixel-sequential method of generating pixel output, which involves determining the colour of graphical objects between their edges and compositing the colours of the contributing objects for the run of pixels between their edges. In these systems, it is desirable have a display list to separate the geometry (edges), from the Z-ordering information (levels) and the colour information (fills).

In one PDLR arrangement, when a re-use of an existing group of objects is detected, the first occurrences (ie first instances) of the display list representations of objects already in the display list may be copied and transformed by copying to the display list further instances of a portion of the edge information containing a base location for the edge, and allowing the copy to share the remaining edge, level and fill information of the original. This is done for all edges (and their accompanying levels and fills) belonging to the group. The geometry that is thus copied may be represented in a coordinate space different from the device resolution, to facilitate fractional-pixel positioning of the objects when copied. In this way, for example, it is possible to satisfy the PDF requirement for "no-distortion" and "constant-spacing" tile patterns.

In another PDLR arrangement, the first instances of the display list representations of the edge geometry, and not merely the starting positions, is copied and transformed to repeated instances of the relevant the display list representations in the display list, allowing more general transformations such as scaling to take place between the copies. All of these schemes allow time to be saved when building the display list, because the objects do not have to be fully processed again from the PDL when they are re-used.

In yet another PDLR arrangement, a test is made to determine whether the group of graphical objects to be repeatedly rendered to the page is better represented as the aforementioned display list format or as a bitmap. This prevents, for example, the extreme case of a tiled region with thousands (or even millions) of small tiles being represented inefficiently as a very large number of separate edges, while allowing a larger tile to be represented in the more efficient display list format. Similar efficiencies are also gained when the display list is being rendered.

In an embodiment of a pixel-sequential renderer suitable to be used by a PDLR arrangement, as depicted in FIG. 1, objects are broken down into edges which proceed down the page from lower-numbered scanlines (Y) to higher-numbered ones.

FIG. 1 shows a display list (also referred to as a display list structure) 100 that consists of a set 101 of scanline edge lists (SEL) such as 108, each edge list being referred to as "SEL", the edge lists being sorted into a starting Y-order in a linked list, as depicted by an arrow 112.

Each of these scanline edge lists (SEL) such as 108 is associated with a list 113 of edge headers (EH) such as 109, . . . , 102 the list 113 being sorted in a starting X-order as depicted by an arrow 111.

Each edge header (EH) such as 102 references, as depicted by an arrow 114, edge segment information 103 describing the geometry of an associated object relative to a base position, level information 104 describing the Z-order (priority) of the object, fill information 105 describing how the object is to be filled (by flat colour, blended colour, image data 106 or the like). Each edge header has an X-position (absolute position), a pointer to the segment information 103, and a pointer to the segment information 104.

When a calling PDL comprising the graphical objects as discussed previously with reference to FIG. 12 adds objects to the display list 100 in FIG. 1, a display list builder breaks down the objects into edges which are sorted by insertion into the set 101 of edge lists (such as 108) and the edge header list 113. The display list builder is the program executed by the processor 1105 which builds the data structures in FIGS. 1, 2, 6, 7 and 8, and these structures are called display list data structures.

Figure 6:
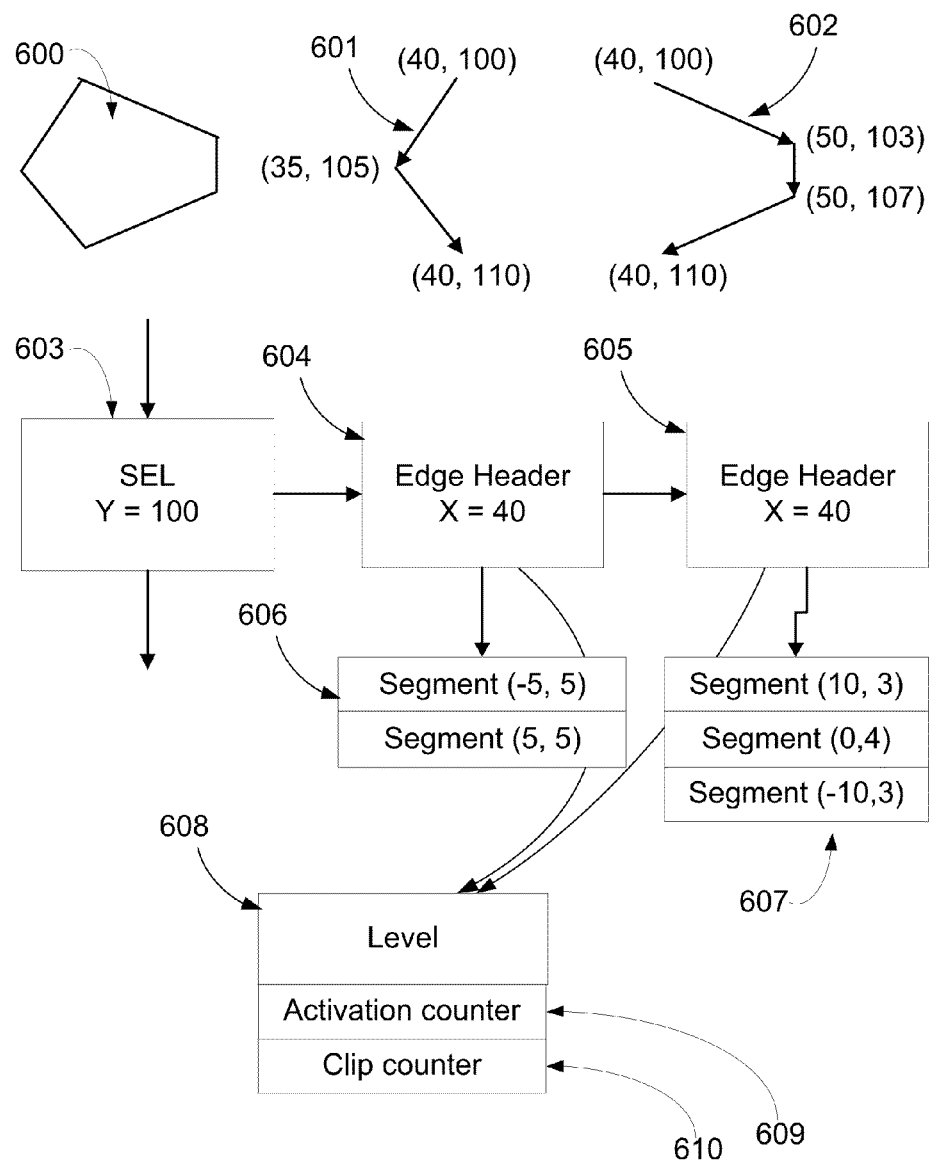
FIG. 6 depicts a part of the display list structure according to a PDLR arrangement, highlighting the edge and its related data structures.

FIG. 6 for example shows an object 600 represented by two edges 601 and 602. To insert these into the display list 100, the builder first inserts an SEL 603 into the display list in the correct Y-order, if no edges already exist starting at this scanline. This SEL 603 then points to two edge header structures 604 and 605 with their associated X-positions, which define the two edges 601, 602 starting at (40,100). These edge header structures 604, 605 in turn point to segment data 606 and 607 representing the positions of further points in the edges relative to the starting positions. For example, segment a (−5,5) will take the edge 601 from the X-Y coordinate (40,100) to an X-Y coordinate (35,105). The Y-offsets must always be non-negative, as an edge cannot go back to earlier scanlines. The X- and Y-offsets are typically small numbers, which may be coded efficiently using minimum memory in a variable-length coding scheme such as Huffman coding or the like. Both of the edge headers also point to the same level 608.

Edges may also come from clipping shapes. These shapes are not visible directly, but they control the appearance of other objects. The level information 104 (see FIG. 1) contains a flag that can identify an object as a clip shape. When this flag is set, the level 104 does not point to a fill such as 105, but instead contains a list of pointers to other levels that are clipped. Adding a clipped object is performed by creating the data structures of FIG. 1, and additionally placing a pointer to its level data into the clip list of the clipping shape.

Figure 7:
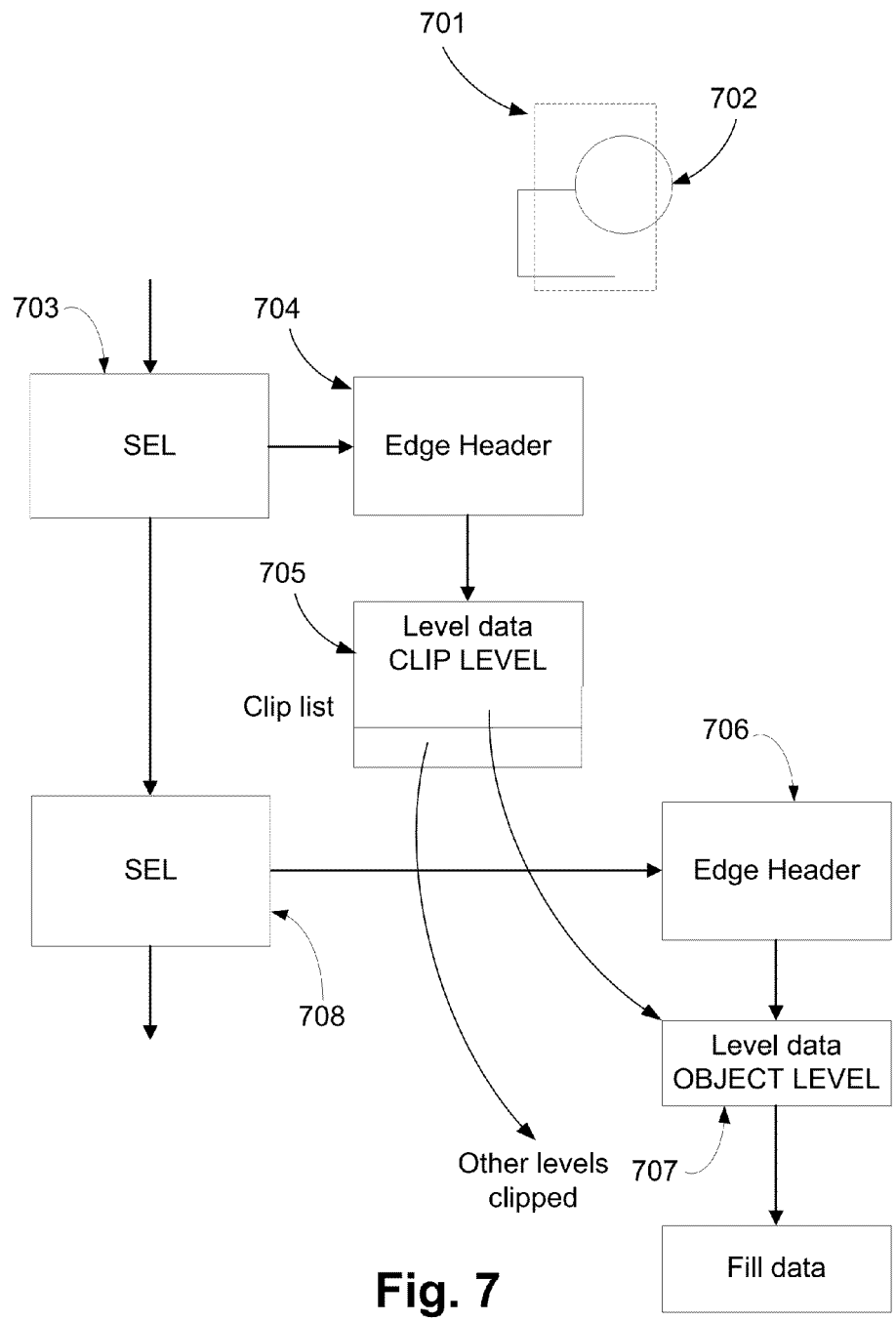
FIG. 7 depicts a part of the display list structure according to a PDLR arrangement, highlighting the clipping level and its related data structures.

FIG. 7 for example shows a clipping shape 701 which clips some objects including a circle 702. The clip shape 701 is inserted into the display list 100 in the usual fashion with a SEL 703 and and an edge header (EH) 704. The edge header 704 has level information 705 that has the clip flag (as depicted by a label "CLIP LEVEL") set. The circle 702 and other objects clipped by the clip shape 701 are also inserted into the display list 100. Accordingly, an edge belonging to the circle 702 is inserted into the display list 100 in the usual fashion with a SEL 708. One edge header from the circle is shown at 706 and its level information is shown at 707 being marked as an ordinary (non-clipping) object level (as depicted by a label "OBJECT LEVEL"). Other edges belonging to the circle 702 (which are not shown in this instance) also point to the same level 707 (the circle 702 typically has two edges, since edges only go down the page). The level information 705 belonging to the clip shape 701 contains a list of all the levels belonging to the clipped objects.

The display list structure 100 in FIG. 1 is rendered in scanline order by traversing the list 101 of edge lists such as 108 and generating pixel runs along each output scanline by tracking the edges introduced by the edge headers such as 102 attached to each edge list such as 108. The visibility of any object is controlled by the edges that activate the level 104. For example, the object 600 in FIG. 6 has an entering edge 601 and an exiting edge 602. Scanlines that cross the entering edge increment an activation counter 609 in the level 608. A nonzero value activates the level, and consequently the relevant part of the object is rendered and colour is generated. When the exiting edge is crossed the activation counter is decremented again.

If the object is clipped, rendering of the object is also controlled by edges activating clip levels which point to the level 104. These clips levels increment and decrement a separate clip counter 610 which also controls colour generation in a similar way to object level activation. An object may be clipped by multiple clips, and a clip many also clip many objects.

Figure 2:
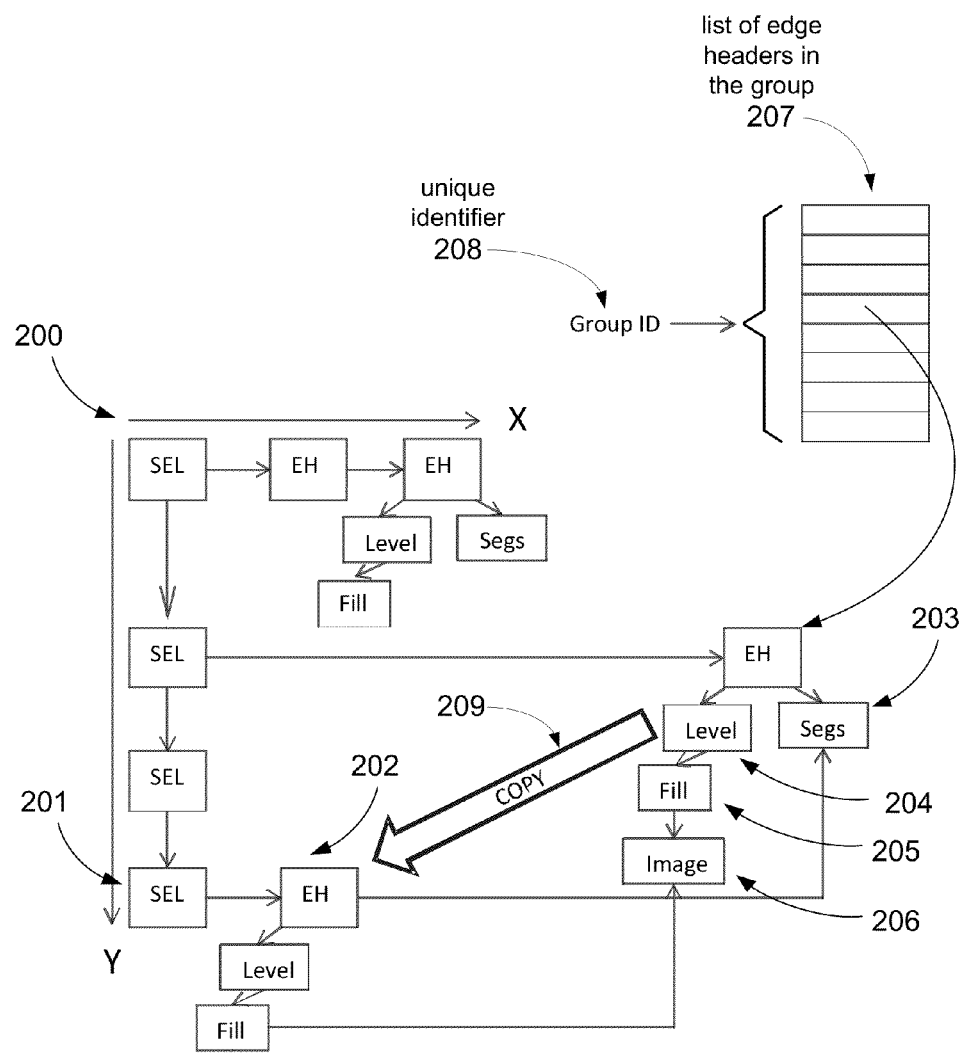
FIG. 2 shows a display list structure as used by a pixel-sequential renderer, with data structures used to represent a group of objects according to a PDLR arrangement.

FIG. 2 shows a display list structure 200 as used by a pixel-sequential renderer, with data structures used to represent a group of objects according to a PDLR arrangement.

A PDL initiates rendering of a group of objects by supplying the unique identifier (ID) 208 with a group starting call. The ID is usually provided by the PDL, or in a practical implementation, the display list builder may provide the ID, as will be explained later. This ID 208 is used to identify the edge headers (regardless of where they occur in the display list structure) as belonging to the group, by placing pointers to the edge headers in a special list 207, separately from the main display list structure 200. The list 207, along with other such lists belonging to other tiled groups where they exist, form a cache in which groups may be quickly found by their ID. The objects in the group (or more specifically display list representations of the group) are then placed into the display list 200, and later rendered. If later the PDL asks for the same group to be drawn (ie rendered) in some other location on the page, the PDLR arrangement assigns the group the same ID value.

Figure 3:
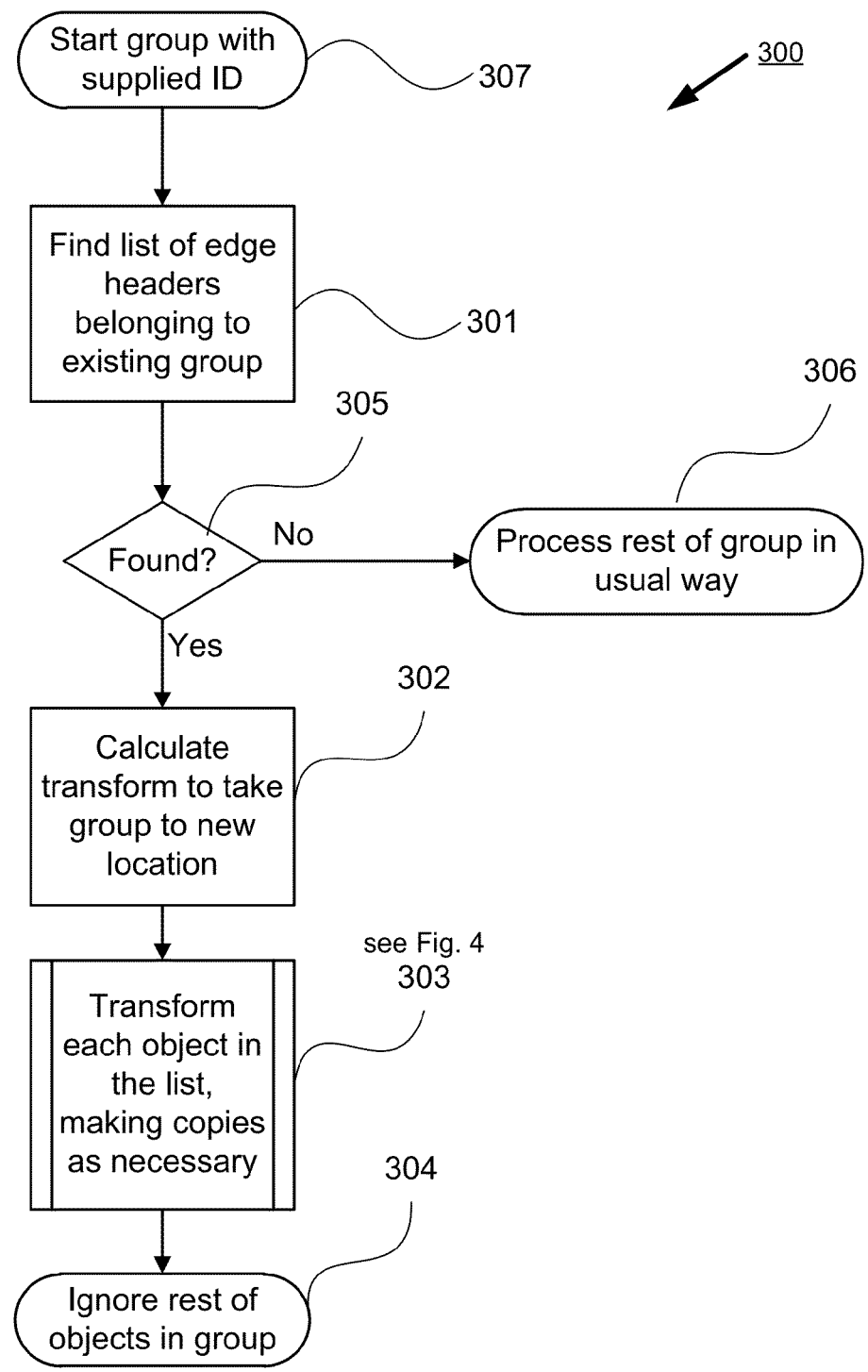
FIG. 3 depicts a flowchart of the steps involved in identifying and copying a group of objects according to a PDLR arrangement.

FIG. 3 depicts a flowchart of the process 300 for identifying and copying a group of objects according to a PDLR arrangement. The process 300 commences with a step 307 in which the processor 1105 in which the PDL initiates rendering of a group of objects by providing a group starting call to the display list builder. In a subsequent finding step 301 the display list builder looks in the cache for the original list 207 of group edge headers using the identifier 208. If in a following decision step 305 the list 207 of edge headers is determined to have been found in the finding step 301, then the process 300 follows a YES arrow from the step 305 to a step 302 in which the processor 1105 determines the transform(s) required in order to create further instances of the display list representations of the group in the display list. The transforms are applied by the display list builder in processor 1105 to execute the transformations of the starting locations of the edges making up the object, with each of the repeated edges sharing the transformations from the starting location of said repeated edge. A following step 303 transforms the original list 207 of group edge headers as necessary. The step 303 creates, as depicted by an arrow 209 in FIG. 2, new scanline edge list 201 and header 202 as necessary. The step 303 which transforms the display list representations of each object associated with the list 207 is described hereinafter in more detail in regard to FIG. 4.

Returning to the decision step 305, if it is determined that the list 207 of edge headers has not been found in the finding step 301, then the process 300 follows a NO arrow from the step 305 to a step 306 in which the processor 1105 processes the rest of the group in the usual way. In other words, if a group (the list of group edge headers 207) is not found in the cache, the processor 1105 adds objects from the PDL to the group in the normal course of events until the rendering of the group is finished. On the other hand, if a group is found in the cache, the objects in the group will still be supplied by the PDL until a group finish call is received. However, the display list builder will ignore (skip) the objects supplied by the PDL until the group is finished. All the group content is retrieved from the cache instead.

Figure 4:
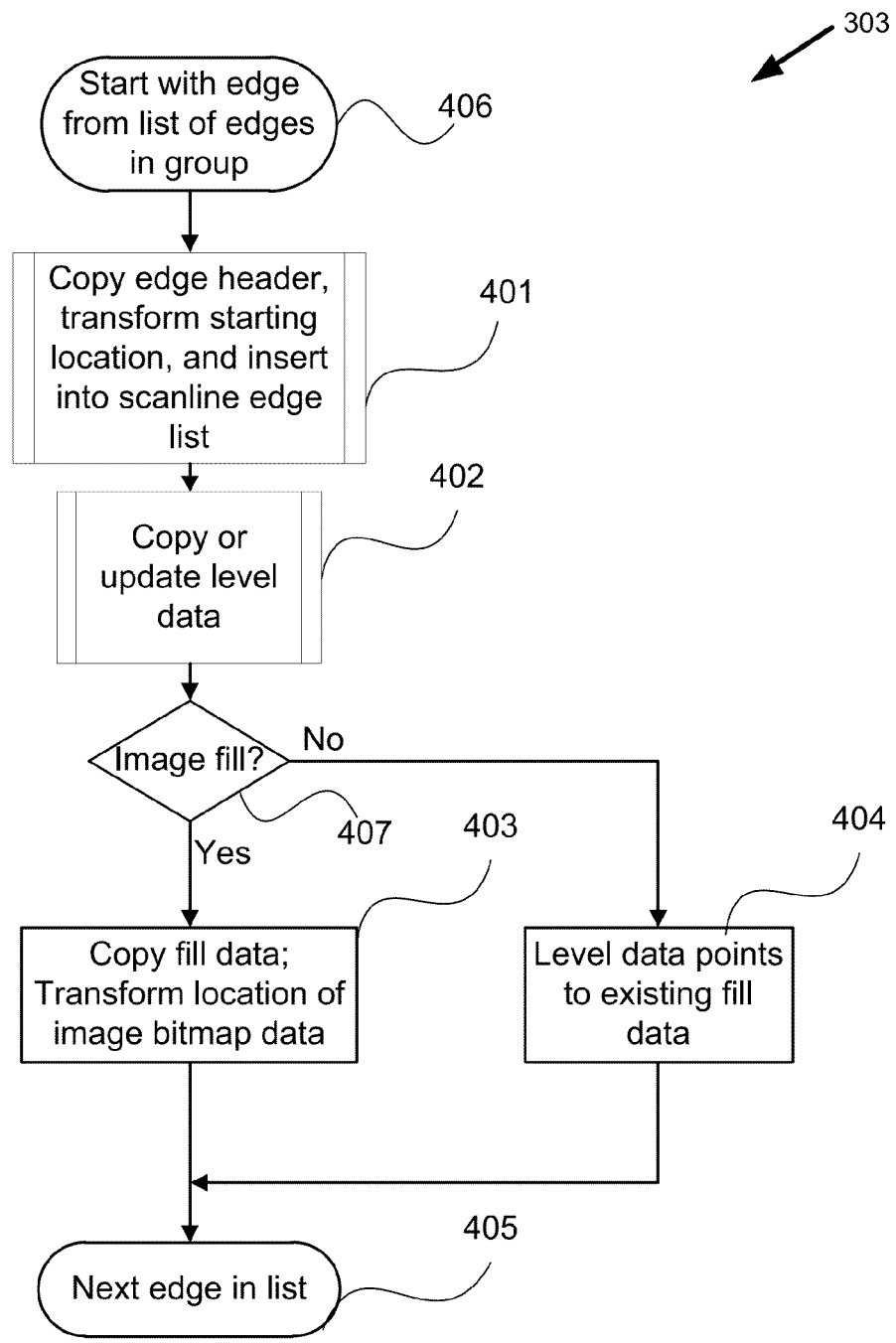
FIG. 4 shows a flowchart of the steps involved in copying an edge and its related data structures belonging to an object in the group, according to a PDLR arrangement.

FIG. 4 shows a flowchart of the transforming and copying process 303 comprising the steps involved in transforming and copying an edge and its related data structures belonging to an object in the group, according to a PDLR arrangement. The process 303 commences with a step 406 in which the edges in the list 207 are received from the PDL and processed one at a time, until all edges belonging to all objects in the group are processed.

Returning to FIG. 2, since segment information (data) 203 does not change for a simple translation, the segment information (data) 203 can be referenced as the original edge at a following copying step 401. The segment information 203 is shared between the original edge header and the new edge header 202. In the copying step, the edge header (EH) 604 is copied by the display list builder and transformed to a new starting location in absolute coordinate form. The edge header with the new starting location in absolute coordinate form is them inserted into the scanline edge list (SEL) by the display list builder.

Other transforms may need the segment information to be copied and transformed.

Process 303 then proceeds to copying and updating step 402, wherein the display list builder in the processor 1105 copies or update the level data of the newly created edge.

A following decision step 407 determines if fill information such as 205 is present, for example if the fill information 205 contains positional information such as blend endpoints or image positions, such as the image data 206. If the step 407 determines that image fill like the image data 206 is present, then the process 303 follows a YES arrow from the step 407 to a step 403 in which the fill 205 is copied and transformed at. If, on the other hand, no image fill is found by the step 407, then the process 303 follows a NO arrow from the step 407 to a step 404 in which the processor 1105 levels the data points to existing fill data. The existing fill data is fill data pointed to by the original edge. For example, fill data 205 is an existing fill data. In the examples illustrated by FIG. 2 and FIG. 8B, the fills references the image data 206, 8B05 and so the fill data are positional. The image data 206 is shared between the original edge header (802, 803) and the new edge header 202 (807, 808).

After either copying the fill data in the step 403 or levelling the data point in the step 404, the process 303 is directed to a step 405 in which the processor 1105 proceeds to process the next edge in the display list.

Figure 8:
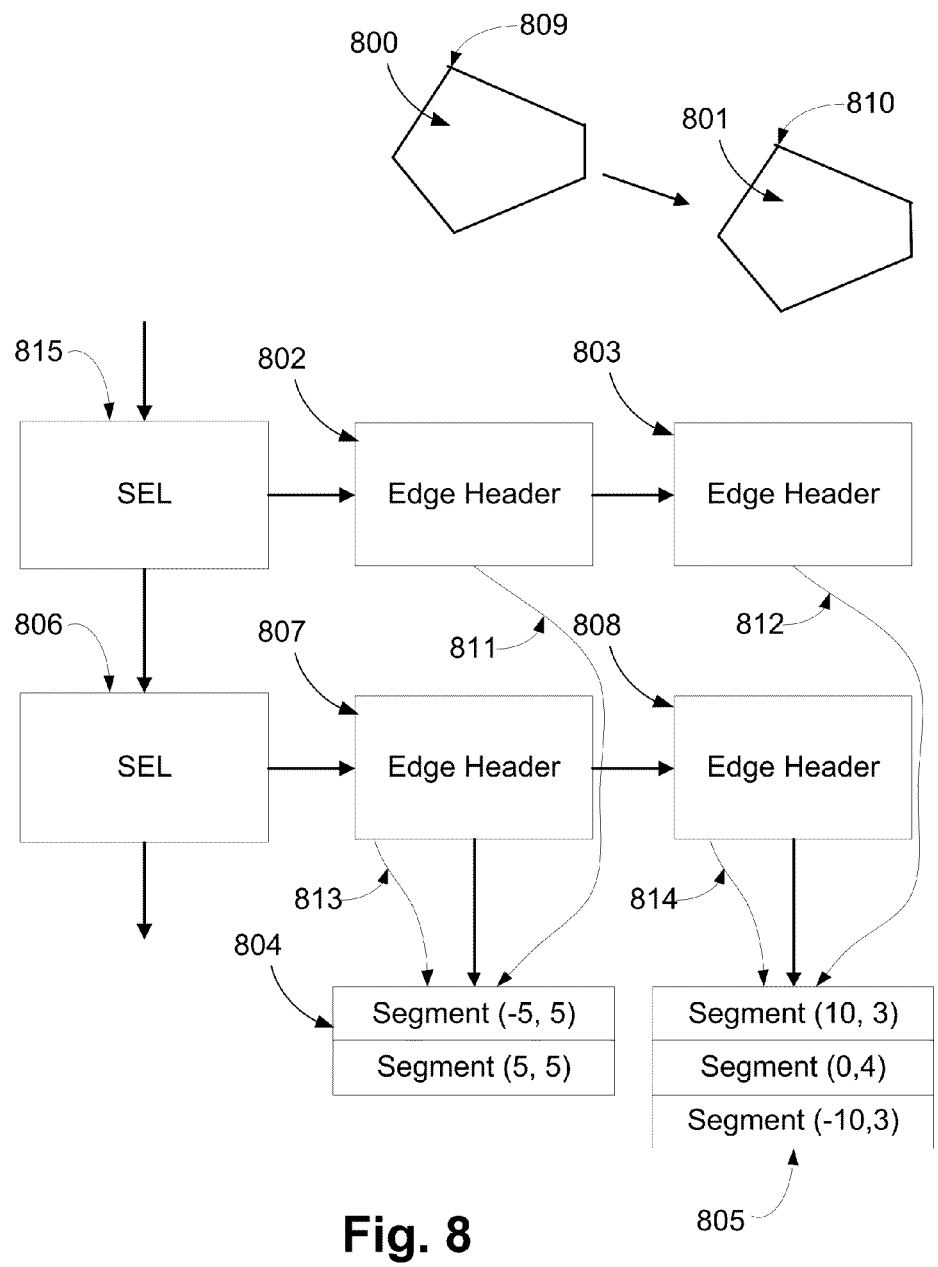
FIG. 8 depicts a part of the display list structure according to a PDLR arrangement, highlighting the edge segment data and the steps taken when edges are copied.

FIG. 8 depicts a part of the display list structure 100 according to a PDLR arrangement, highlighting the edge segment data and the steps taken when edges are copied. FIG. 8 shows an (original) object 800 which is to be copied to a new object 801 by translation. An original SEL 815, being the first instance of the SEL in the display list, relates to an original Y-position 809 of the object 800. Original edge headers 802 and 803 point to segment data 804 and 805 of edges, as depicted by respective arrows 811, 812. A new SEL 806, being transformed from instance of the SEL 815, is created at a new Y-position 810 of the top of the new object 801. New edge headers 807 and 808 are also created, one for each edge of the new object 801. If the transformation is a simple translation, these new edge headers 807 and 808 point to the original segment data 804 and 805 respectively, as depicted by respective arrows 813, 814, by sharing the original segment data 804 and 805 with the original edge headers 802 and 803 since this data is the same for both objects. The original segment data 804, 805 encodes the offsets of the endpoints of the edges from the starting location, and thus is usable by other repeated objects in the PDL. However, more complex transforms require new transformed segment data to be created instead of the original segment data 804 and 805. In any event, each edge is copied and transformed separately, without knowledge of the object that originally created it, and at render time all the edges are treated separately as well.

Figure 8B:
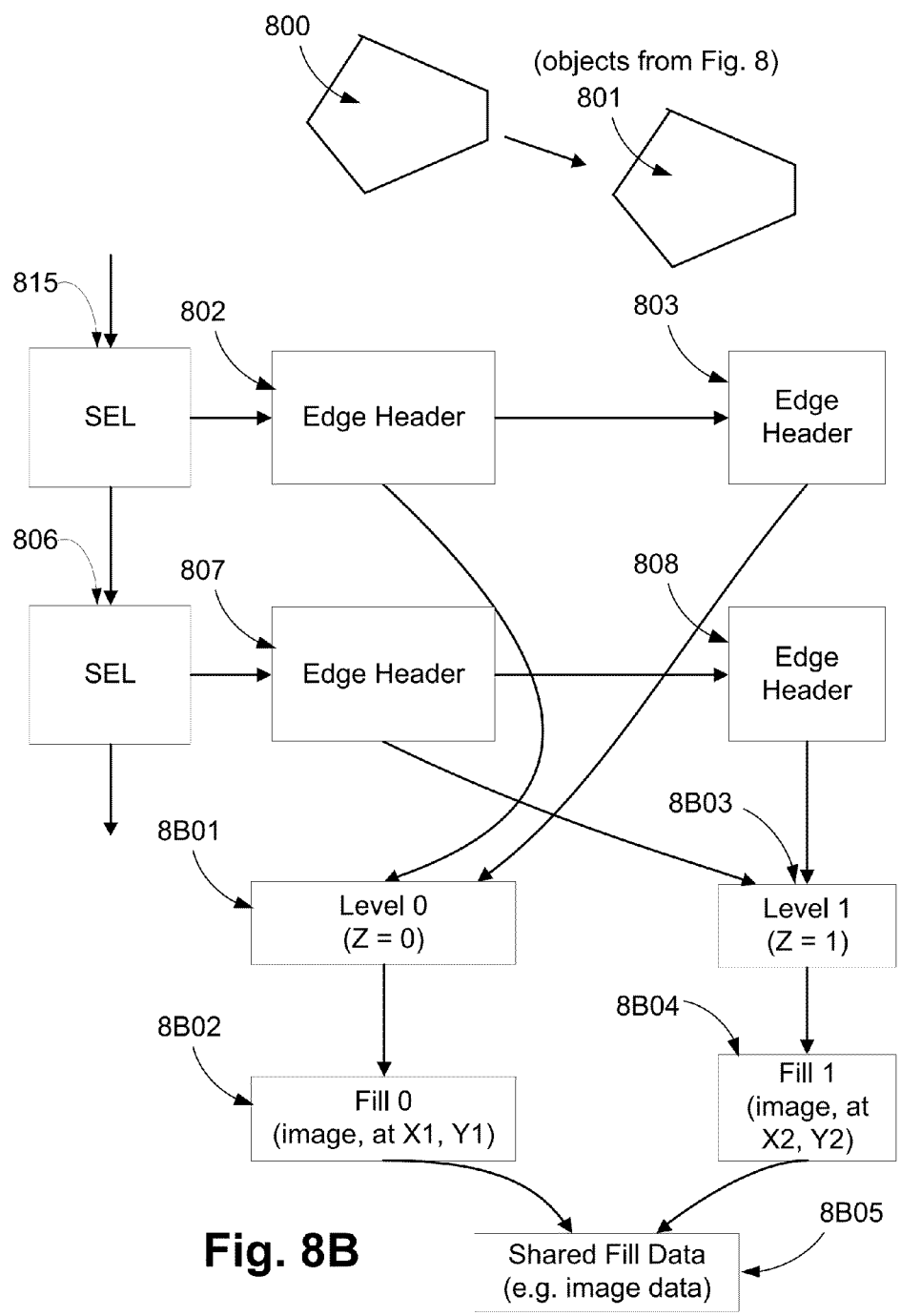
FIG. 8B depicts a part of the display list structure according to a PDLR arrangement, highlighting the edge segment data and the steps taken when edges are copied, supposing that these objects are filled with a bitmap image.

FIG. 8B for example considers the objects of FIG. 8 with respect to their level and fill data, supposing that these objects are filled with a bitmap image. The edge headers 802, 803 associated with the original SEL 815 of the original object 800 point to the same level 8B01, which in turn points to a fill data 8B02 and thence to a block of bitmap data 8B05. The new SEL 806 and new edge headers 807, 808 are created as before. These new edge headers 807, 808 point to a new level 8B03 which is a copy of the original level 8B01 with an updated Z-order, and thence to a new fill 8B04 which has updated positioning information to move the image to the new location. The newly copied object has a new Z-order in practice even if there is no overlap, as the optimisations are time-consuming for little gain in computational complexity. Furthermore, if the level points to an image fill, the fill will be different, so the level has to be different.

The position-independent image data 8B05 is not copied but shared between the fills 8B02 and 8B04. If the fill was not position-dependent (such as a flat colour) it would simply be shared between the levels 8B01 and 8B03.

In most cases (the common case being simple translation), the data copied or created anew in the display list is small and fixed-length, such as the edge headers 802 and 803 and the levels and fills 8B01 and 8B02, while arbitrary-length data such as the image bitmap data 8B05 is already in the display list and can be accessed by reference. Even for an arbitrary transformation of the geometry of the object 800, only the segment data need additionally be created anew. By sharing the level information and the fill information that are not position dependent, the process of rendering repeated objects saves memory compared to the process of receiving the objects from the PDL, and improves render performance due to greater locality of data in memory compared to a completely separate display list representation. The improved locality of data in memory results in better use of processor cache 1148. It is also much faster at display list build time than receiving and copying all the group objects again from the PDL, because colour transformation, clip processing and the like required to place the group objects in display list format are only performed once. The remaining objects in the group are then bypassed at the step 304.

Figure 5:
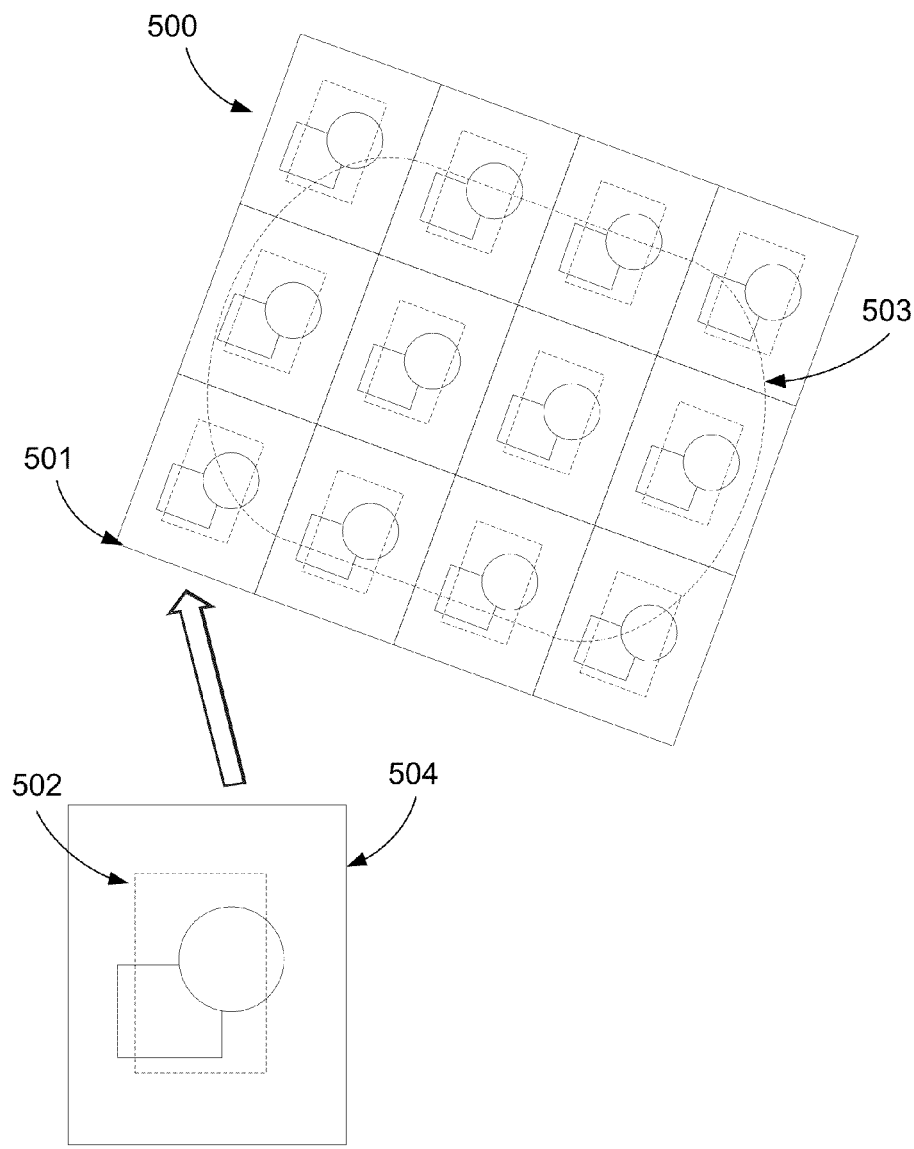
FIG. 5 depicts a region of the page tiled with repetitions of a group of objects according to another PDLR arrangement.

FIG. 5 depicts a region of the page tiled with repetitions of a group of objects according to another PDLR arrangement. In FIG. 5 a PDL initiates a plurality or group of graphical objects 504 (also referred to as a tile) which is to be tiled over a region 500 at some regular spacing (in either device resolution or some user-defined coordinate space). In this case the display list builder in the processor 1105 will check, using a process 1300 depicted in FIG. 13, the memory used by a pixel representation of the tile (since the display list builder now knows the size of the pixel representation of the tile) against a threshold which depends on the number of repetitions of the tile in the region and the complexity of the display list representation of the tile.

Figure 13:
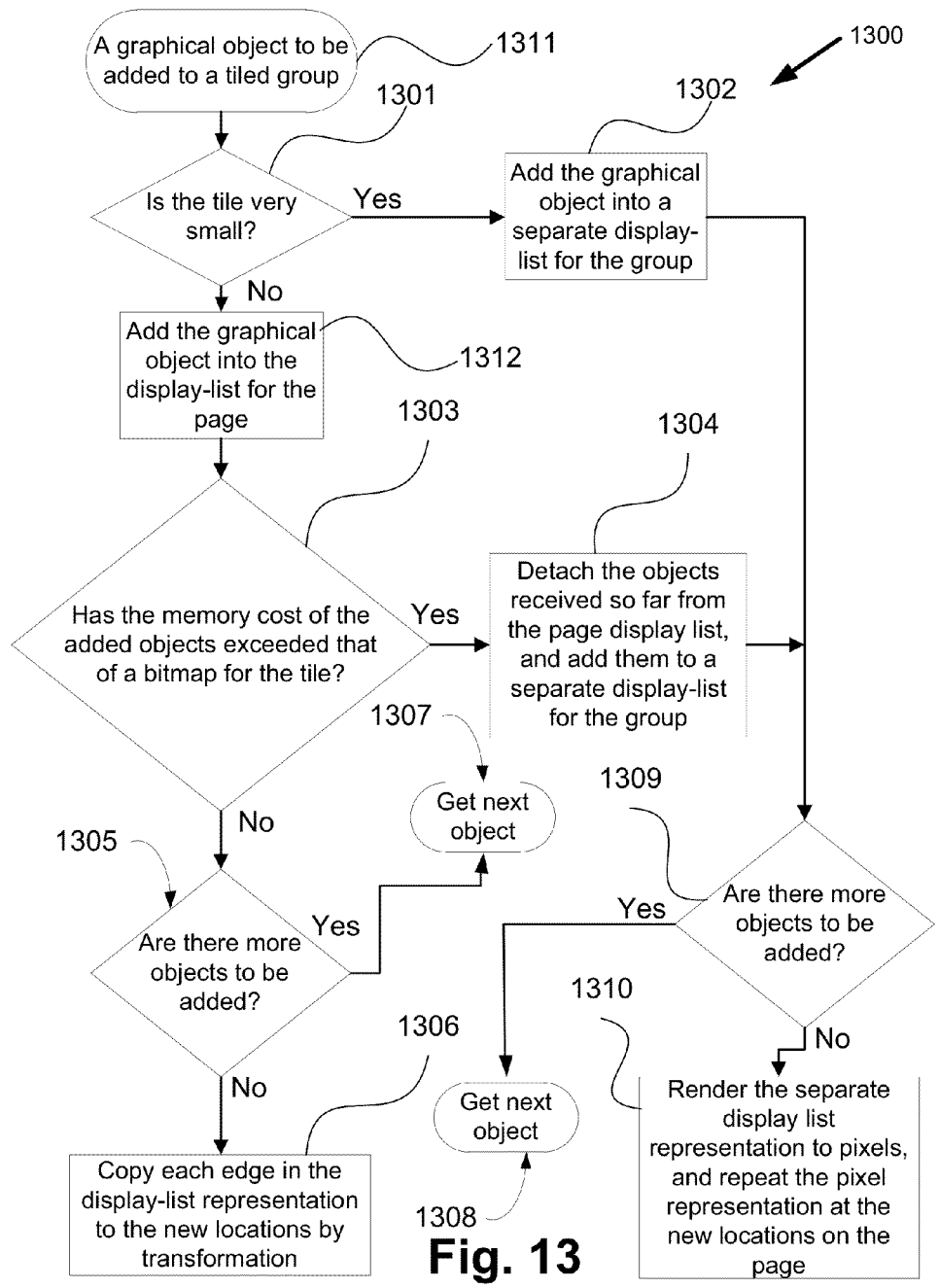
FIG. 13 depicts a flowchart of the steps of determining whether a group of objects to be tiled onto a region are represented using a display list or a bitmap, according to a PDLR arrangement.

FIG. 13 depicts a flowchart of a process 1300 for determining whether a group of objects to be tiled onto a region are represented using a display list or a bitmap, according to a PDLR arrangement. The process 1300 commences with a step 1311 which is performed in the event that a graphical object is to be added to a tiled group. A following decision step 1301 determines if the spatial region size of a tile for the first instance is sufficiently smaller than the threshold to use a pixel representation for the first instance for copying the pixel representation at a plurality of locations on a page (because the data amount of the pixel representation is small enough compared with one of the display list representations of all the tiles as determined in decision step). This is a common occurrence as very small tiles are often copied many times. If this is the case, then the process 1300 follows a YES arrow from the step 1301 to a step 1302 which builds a small display list for just the objects in the group, rendered to pixels, and the resulting image is tiled by repeated rendering to the page. The process 1300 is then directed to a decision step 1309.

If the step 1301 returns a FALSE value (the spatial region size of a tile for the first instance is not smaller than the threshold), which is typically the case because the complexity of the display list representation is in general not known beforehand, then the process follows a NO arrow from the step 1301 to a step 1312 in which the display list builder accumulates objects received for the tile into the display list. The process 1300 is then directed to a decision step 1303 which conducts a comparison to determine if the memory cost of the added objects exceeds that of the bitmap of the tile. If this is the case the process 1300 follows a YES arrow from the step 1303 to a step 1304 which renders the added objects to a separate image part way through receiving objects for the tile, if the complexity of the added objects becomes great enough. The rendering step 1304 thus detaches the edges and associated data of the added objects from the main display list, and creates a separate display list for the tile. The process 1300 is then directed to a decision step 1309.

As noted in regard to the decision step 1301, if the pixel dimensions of the tile are small enough, the decision step 1303 is skipped as for very small tiles any display list representation will exceed the size of the image.

If it is favourable to represent the tile using the display list representation, the display list builder, in process 1300, will assign a unique ID to the tile, even if the PDL has not supplied one by determining if it is favourable to represent the tile using a display list representation.

Returning to the decision step 1303, if the memory usage of the added object does not exceed the bitmap of the tile, the process 1300 follows a NO arrow from the step 1303 to a step 1305 in which the processor 1105 proceeds to check if there are more objects to be added to the display list of the page. If there are more objects to be added to the display list, the process 1300 follows a YES arrow from the step 1305 to a step 1307 in which the processor 1105 retrieves the next object for addition to the display. On the other hand, if it is determined by the step 1305 that there are no further objects to be added to the display list, the process 1300 follows a NO arrow from the step 1303 to a step 1306 in which the processor 1105 repeatedly copies the display list representation for each edge to the plurality of the new locations of the a separate tile using the appropriate transformation operation such as translation, skew or rotation or a combination of these operations.

After the memory usage (cost) is determined to exceed that of a bitmap of a tile in the decision step 1303, and the objects received so far are detached and a separate display list is created in the step 1304, the process 1300 is directed to the decision step 1309 in which the processor 1105 proceeds to determine if there are more objects to be added to the display list. If this is the case the process 1300 follows a YES arrow from the step 1309 to a step 1308 in which the processor 1105 gets the next object. If however there is no further object to be added to the display list, the process 1300 follows a NO arrow from the step 1309 to a step 1310 in which the processor renders the newly created display list representation to pixels, and repeats the pixel representation at different locations in absolute coordinate form on the page according to the repeated tiles requirement.

Returning to FIG. 5, the position 501 of the first tile visible in the tiled region 500 is determined, as are the number of tiles to be generated. The coordinate space of the group of objects in the tile 504 as given by the PDL is not in general the same as that of the first visible tile 501, so the coordinate space is adjusted to suit. For example, the tiled region may be anywhere on the page, but the PDL typically supplies objects to be placed in the tile in an entirely separate coordinate space starting at (0,0), with the expectation that the tile as a whole will be transformed to page coordinates. The objects in the tile are therefore transformed into their final positions in the first visible tile 501 as they are placed in the display list.

After an object has been received and a display list representation thereof placed in the display list for the first visible tile 501, its edges may be generated using the same steps as described in FIGS. 3 and 4 at new locations in absolute coordinate form within the tiled region 500. This copying process takes place between display list representations of objects (edges, fills and levels) and makes use of objects already processed without further reference to the PDL, sharing segment and image data in the same way as described in relation to FIGS. 8 and 8B.

In one PDLR arrangement the edges generated for each object are placed in the PDL for the first visible tile and copied to multiple locations when the group is finished (when the PDL makes a group finish call to the DL builder). In another PDLR arrangement, the edges generated for each object are generated in multiple locations as each object is received from the calling PDL. In this case, attention must be paid to the Z-ordering of the objects, to ensure that all the objects in one tile are adjacent in Z-order, so the tile lies completely above or below its neighbouring tile. This may be done when all the objects are received, by remapping the levels now that the total number of levels making up one tile is known.

Figure 14:
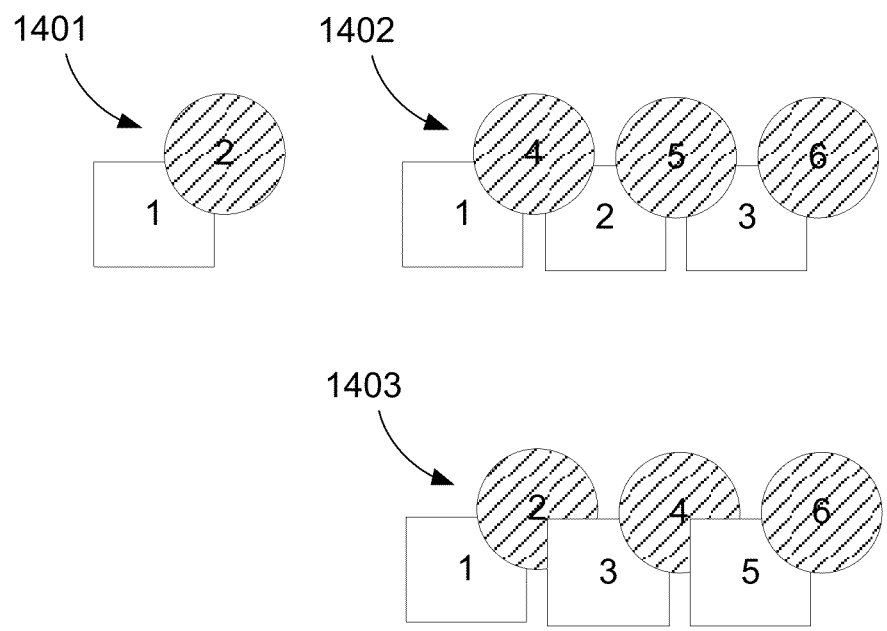
FIG. 14 depicts a region of the page tiled with objects showing the processing of overlapping tiles according to a PDLR arrangement.

FIG. 14 depicts a region of the page tiled with objects showing the processing of overlapping tiles according to a PDLR arrangement. FIG. 14 shows two objects 1 and 2 at 1401. These objects are received and the edge representation for three tiles is made with the Z-ordering shown at 1402. In particular, the hatched circles labelled 2 in the original group

1401 appears to be on top of a copy of the square labelled 1 in the original group 1401 in the adjacent tile. Thus, the output 1402 is incorrect because the second tile containing square 2 in the second tile should have a higher Z-order priority than circle 4 in the first tile. Thus, in an event that the tiles are known to overlap one another, the Z-ordering of the objects in the group are rearranged and remapped to that of 1403, restoring the correct appearance of the tiles. In the output 1403, the square 3 is seen to have a higher Z-order priority than circle 2 in the first tile. If it is known that the tiles do not overlap one another, this step is not necessary.

Since the copied edges are tracked independently of those belonging to the first tile, they can be placed at fractional-pixel locations or otherwise transformed by flipping or the like, and the array of tiles is not restricted to alignment with the page; it may be scaled and rotated as shown in FIG. 5.

Special treatment must be given to clipping edges. Clips 502 inside the group must be distinguished from those 503 that clip the entire tiled region, and only the former copied with the group, but the latter must be made to clip every copy of the tile by adding pointers to all the newly copied levels to the clip lists of the levels attached to the clip shape 503.

Figure 9:
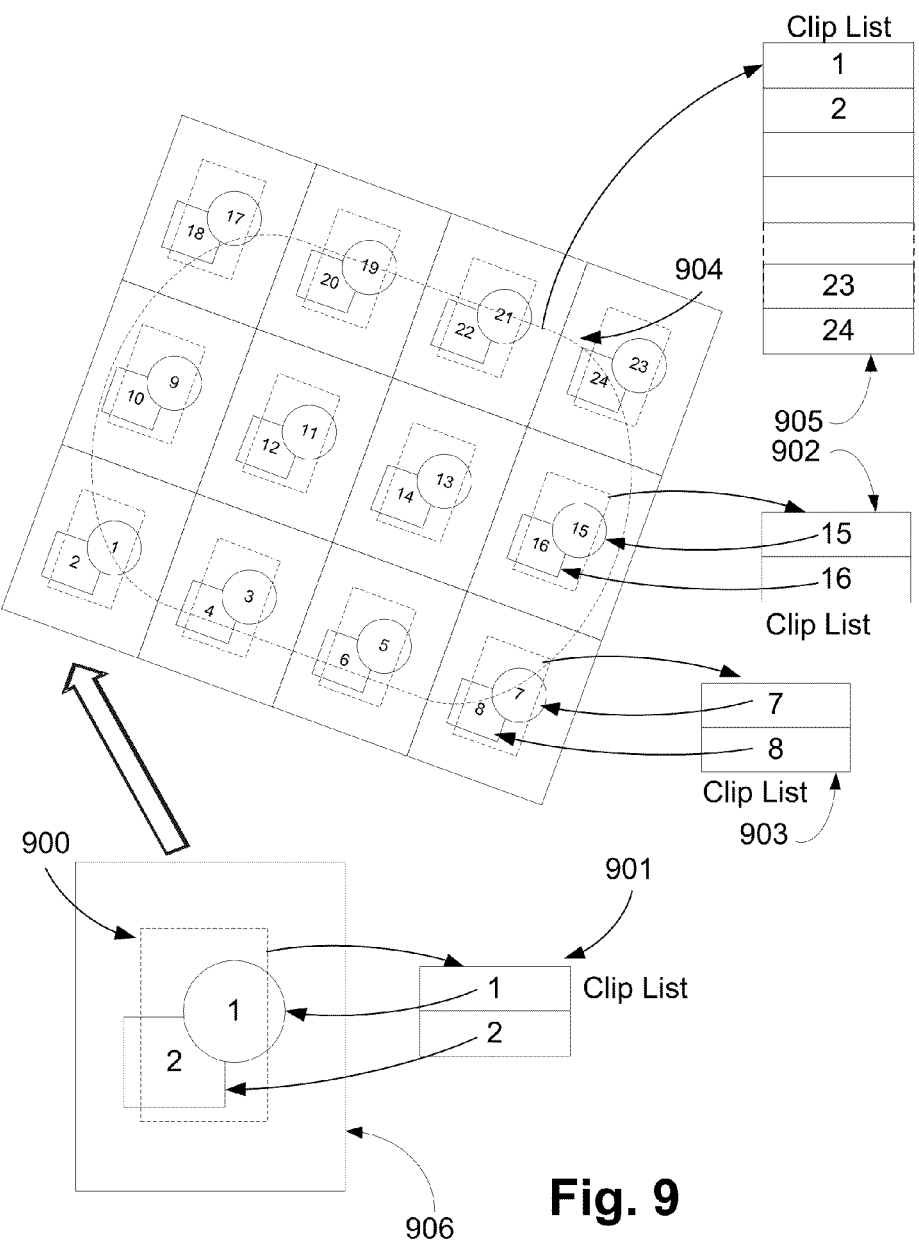
FIG. 9 depicts a region of the page tiled with repetitions of a group of objects according to another PDLR arrangement, highlighting the clipping data structures therein.

FIG. 9 depicts a region of the page tiled with repetitions of a group of objects according to another PDLR arrangement, highlighting the clipping data structures therein. FIG. 9 shows a tile 906 that contains a clip 900 which clips two other objects 1 and 2. The levels of the objects 1, 2 are shown in a clip list 901. When this tile 906 is repeated, the edges and levels are copied according to the process steps described in relation to FIG. 10.

FIG. 10 depicts a flowchart of a process 1000 for copying clipping data structures belonging to objects in a group, according to a PDLR arrangement. The process 1000 commences with a step 1001 which processes all edges in the group (not just clipping edges). The decision step 1001 determines if the clipping edge being considered is for the entire tiled region (eg such as the clip 904). If this is not the case, the process 1000 follows a NO arrow from the step 1001 to a step 1004 which copies and transforms the edge header. However, the clip 904 that clips the entire tiled region is detected at the step 1001 and the clip is not copied by the step 1004.

A following step 1005 copies the level data including any clip list. A following decision step 1008 determines if the edge is a clipping edge, and if so the process 1000 follows a YES arrow from the step 1008 to a step 1002. The step 1002 updates the previously copied clip list for the new level to point to copies of the clipped levels, and also repeats the clip 900 with it's clip list 901, and a new clip list is created. Two such repetitions are shown at 902 and 903. The process 1000 is then directed to a step 1007 and terminates.

Returning to the step 1001, if the clipping edge being considered is for the entire tiled region, then the process 1000 follows a YES arrow from the step 1001 to a step 1003. The levels belonging to copies of tiles such as 902 and 903 are added to its clip list 905 at the step 1003. In this example there are 12 tiles each having 2 object levels, so the clip list 905 will have 24 entries in total. The process 1000 is then directed to the terminating step 1007, which is a fetching step to obtain a next edge to be processed.

Returning to the step 1008, if no clipping edge is found, the process 1000 follows a NO arrow from the step 1008 10 a step 1007 and the process 1000 terminates. In the fetching step 1007, the processor 1105 gets a next edge to be processed. The process terminates when all edges are processed.

The arrangements described are applicable to the computer and data processing industries and particularly for the printing and display industries.

The foregoing describes only some arrangements of the present invention, and modifications and/or changes can be made thereto without departing from the scope and spirit of the invention, the arrangements being illustrative and not restrictive.

The invention claimed is:

1. A computer-implemented method for controlling an image rendering device to render repeatedly a group of graphical objects in a display list within a fixed amount of memory, the graphical objects being represented by edges having at least their starting locations in absolute coordinate form, the method comprising the steps of:
    identifying a first occurrence of the group of graphical objects in the display list;
    repeating the first occurrence of the group at a plurality of locations by generating a display list representation by sharing, in the display list, at least one of:
        (a) transformations of the starting locations of the edges making up the graphical objects within the group;
        (b) fill data associated with level information of the first occurrence of the group; and
        (c) edge segment data of the edges of the graphical objects within the group;
    rearranging the level information for the graphical objects within the group to ensure that each occurrence of the group is either above or below in Z-order relative to a neighboring occurrence of the group; and
    rendering, by the image rendering device, the group of graphical objects to the corresponding plurality of locations in accordance with rearranged level information using the shared display list representation in the display list.

2. The method according to claim 1, in which the transformations of the starting locations of the edges making up said repeated object are one or more of translation, skew, and rotation.

3. The method according to claim 1, further comprising selecting between (a) repeating the object by transforming the first occurrence of the display list representation of the object, or alternatively (b) rendering the first occurrence to pixels and repeating the resulting pixels based on a tile size corresponding to the first occurrence.

4. The method according to claim 3, wherein said selecting is based on a comparison of the memory usage of the display list representation and that of the pixel representation.

5. The method according to claim 3, wherein said selecting is based on comparing said pixel representation to a size threshold, said size threshold based on a number of the objects.

6. The method according to claim 1, in which at least some of said edges in said display list representation of the object are clipping edges, and in which:
    (a) if said clipping edges are to be transformed with the object, repeating said clipping edges using said transformation; and
    (b) if said clipping edges are to clip a region containing a plurality of instances of said object, marking said clipping edges with copies of said objects after transforming said object.

7. The method according to claim 1, further comprising:
    creating an edge header in the display list for each occurrence of the at least one graphical object, wherein each edge header comprises a corresponding starting location in absolute coordinate form of that occurrence and a reference to the shared display list representation.

8. The method according to claim 1, wherein the edge segment data defines relative offsets for placement pixel-aligned segments of the edges of the at least one object.

9. An apparatus for rendering repeated instances of at least one graphical object in a display list, the at least one graphical object being represented by edges having at least their starting locations in absolute coordinate form, said apparatus comprising:
 a processor; and
 a memory storing a program configured to direct the processor to render the at least one object by performing the steps of:
  identifying a first occurrence of the group of graphical objects in the display list;
  repeating the first occurrence of the group at a plurality of locations by generating a display list representation by sharing, in the display list, at least one of:
   (a) transformations of the starting locations of the edges making up the graphical objects within the group;
   (b) fill data associated with level information of the first occurrence of the group; and
   (c) edge segment data of the edges of the graphical objects within the group;
  rearranging the level information for the graphical objects within the group to ensure that each occurrence of the group is either above or below in Z-order relative to a neighboring occurrence of the group; and
  rendering the group of graphical objects to the corresponding plurality of locations in accordance with rearranged level information using the shared display list representation in the display list.

10. A non-transitory computer readable memory storing a computer executable program for directing a processor to render repeated instances of at least one graphical object in a display list, said plurality of graphical objects being represented by edges having at least their starting locations in absolute coordinate form, said program comprising:
 computer executable code for identifying a first occurrence of the group of graphical objects in the display list;
 computer executable code for repeating the first occurrence of the group at a plurality of locations by generating a display list representation by sharing, in the display list, at least one of:
  (a) transformations of the starting locations of the edges making up the graphical objects within the group;
  (b) fill data associated with level information of the first occurrence of the group; and
  (c) edge segment data of the edges of the graphical objects within the group;
 computer executable code for rearranging the level information for the graphical objects within the group to ensure that each occurrence of the group is either above or below in Z-order relative to a neighboring occurrence of the group; and
 computer executable code for rendering the group of graphical objects to the corresponding plurality of locations in accordance with rearranged level information using the shared display list representation in the display list.

11. A method of rendering repeatedly a group of graphical objects in a display list by an image rendering device, the method comprising the steps of:
 determining a tile size of a first occurrence of at least one object in the group;
 if the tile size is smaller than a threshold, rendering, by the image rendering device, a display list representation to a pixel representation for the first occurrence of the group and copying repeatedly the pixel representation to a plurality of locations on a page; and
 if the tile size is not smaller than a threshold, copying repeatedly the display list representation to a plurality of locations on the page and rendering, by the image rendering device, the repeated display list representation, where the rendering is based on level information which is rearranged to ensure that all objects in each occurrence of the group are grouped together in Z-order, so that each occurrence of the group is either above or below in Z-order relative to a neighboring occurrence.

12. An apparatus for rendering repeatedly at least one object in a display list, the apparatus comprising:
 a processor; and
 a memory storing a program configured to direct the processor to render the at least one object by performing the steps of:
  determining a tile size of a first occurrence of at least one object in a group;
  if the tile size is smaller than a threshold, rendering a display list representation to a pixel representation for the first occurrence of the group and copying repeatedly the pixel representation to a plurality of locations on a page; and
  if the tile size is not smaller than a threshold, copying repeatedly the display list representation to a plurality of locations on the page and rendering the repeated display list representation, where the rendering is based on level information which is rearranged to ensure that all objects in each occurrence of the group are grouped together in Z-order, so that each occurrence of the group is either above or below in Z-order relative to a neighboring occurrence.

13. A non-transitory computer readable memory storing a computer executable program for directing a processor to render repeated instances of at least one graphical object in a display list, said program comprising:
 computer executable code for determining a tile size of a first occurrence of at least one object in a group;
 computer executable code for, if the tile size is smaller than a threshold, rendering a display list representation to a pixel representation for the first occurrence of the group and copying repeatedly the pixel representation to a plurality of locations on a page; and
 computer executable code for, if the tile size is not smaller than a threshold, copying repeatedly the display list representation to a plurality of locations on the page and rendering the repeated display list representation, where the rendering is based on level information which is rearranged to ensure that all objects in each occurrence of the group are grouped together in Z-order, so that each occurrence of the group is either above or below in Z-order relative to a neighboring occurrence.

14. A computer-implemented method for rendering repeated objects by an image rendering device, the method comprising the steps of:
 receiving a print job to render a plurality of objects, the print job comprising at least one tiling command to repeat a reusable group of objects at a plurality of locations on a page;
 in response to detecting the tiling command, storing, in a reusable group memory, fill data and edge segment data of edges of the reusable group;
 generating a display list by creating, in a display list memory, at least one entry for each instance of the reusable group, wherein each entry is associated with level data;

sharing the fill data and the edge segment data among a plurality of instances of the reusable group by referencing in the display list memory, for each instance of the reusable group, corresponding data in the reusable group memory;

if at least two neighbouring instances of the reusable group overlap, adjusting level data for the neighbouring instances of the reusable group by grouping objects within each instance together in Z-order so that each instance of the reusable group is either above or below in Z-order relative to a neighboring instance of the group; and rendering, by the image rendering device, the instances of the reusable group in accordance with the adjusted level information using the shared fill data and the shared edge segment data.

15. The method according to claim 14, wherein the level data corresponds to an order of receiving objects of the reusable group.

* * * * *